US009232551B2

(12) United States Patent  
De Pasquale et al.

(10) Patent No.: US 9,232,551 B2  
(45) Date of Patent: Jan. 5, 2016

(54) SYSTEM AND METHOD FOR TRANSMITTING DATA PACKETS TO A PLURALITY OF MOBILE TERMINATIONS THROUGH A SINGLE IP CONNECTION

(71) Applicant: Vodafone IP Licensing Limited, Newbury, Berkshire (GB)

(72) Inventors: Andrea De Pasquale, Madrid (ES); Francisco Javier Dominguez Romero, Madrid (ES); Yannick Le Pezennec, Madrid (ES)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 287 days.

(21) Appl. No.: 13/861,257

(22) Filed: Apr. 11, 2013

(65) Prior Publication Data

US 2013/0272225 A1    Oct. 17, 2013

(30) Foreign Application Priority Data

Apr. 11, 2012   (ES) .................................. 201230542

(51) Int. Cl.
```
H04W 76/02      (2009.01)
H04W 36/28      (2009.01)
H04W 88/06      (2009.01)
```

(52) U.S. Cl.
CPC ............ *H04W 76/025* (2013.01); *H04W 36/28* (2013.01); *H04W 88/06* (2013.01)

(58) Field of Classification Search
CPC ............ H04L 63/0272; H04L 61/1511; H04L 12/4633; H04L 12/2602; H04W 80/04
See application file for complete search history.

(56) References Cited

U.S. PATENT DOCUMENTS

| 2007/0091862 | A1* | 4/2007 | Ioannidis ...................... 370/338 |
| 2013/0215825 | A1* | 8/2013 | Hsu et al. ...................... 370/328 |
| 2014/0369201 | A1* | 12/2014 | Gupta et al. .................. 370/235 |

FOREIGN PATENT DOCUMENTS

| EP | 1 693 994 A1 | 8/2006 |
| EP | 2 291 048 A1 | 3/2011 |

OTHER PUBLICATIONS

Kristian Evensen et al: "A network-layer proxy for bandwidth aggregation and reduction of IP packet reordering", Local Computer Networks, 2009. LCN 2009. IEEE 34th Conference on, IEEE, Piscataway, NJ, USA, Oct. 20, 2009, pp. 585-592, XP031581515, ISBN: 978-1-4244-4488-5.

Kameswari Chebrolu et al: "Bandwidth Aggregation for Real-Time Applications in Heterogeneous Wireless Networks", IEEE Transactions on Mobile Computing, Los Alamitos, CA, US, vol. 5, No. 4, Apr. 1, 2006, pp. 388.403, XP001545978, ISSN: 1536-1233.

Phatak D S et al: "A novel mechanism for data streaming across multiple IP links for improving throughput and reliability in mobile environments", Proceedings IEEE INFOCOM 2002, New York, NY, Jun. 23-27, 2002; [Proceedings IEEE INFOCOM. The Conference on Computer Communi, vol. 2, Jun. 23, 2002, pp. 773-781, XP010593639, DOI: 10.1109/INFCOM.2002.1019323, ISBN: 978-0-7803-7476-8.

EPO: European Search Report for EP 13163083.2-1854 dated Jul. 8, 2013.

* cited by examiner

*Primary Examiner* — Jung Park  
(74) *Attorney, Agent, or Firm* — Workman Nydegger

(57) ABSTRACT

The invention refers to a radio network entity for transmitting data packets from an IP gateway in a telecommunications network to a user terminal via a plurality of mobile terminations through a single IP connection. The radio network entity comprises:

a module for establishing IP connections between the IP gateway and mobile terminations, for activating first and second IP connections and first and second radio connections in response to respective requests from first and second mobile terminations;

a packet splitter that applies a splitting algorithm to determine which radio connection is to be used to transmit which data packets, the packet splitter being in communication with a packet combiner in the user terminal;

wherein the packet splitter splits the data packets coming only from the first IP connection selected by the user terminal as the only IP connection through which the data packets are received, thereby transmitting data packets over said first and second radio connections for combining at the packet combiner.

13 Claims, 3 Drawing Sheets

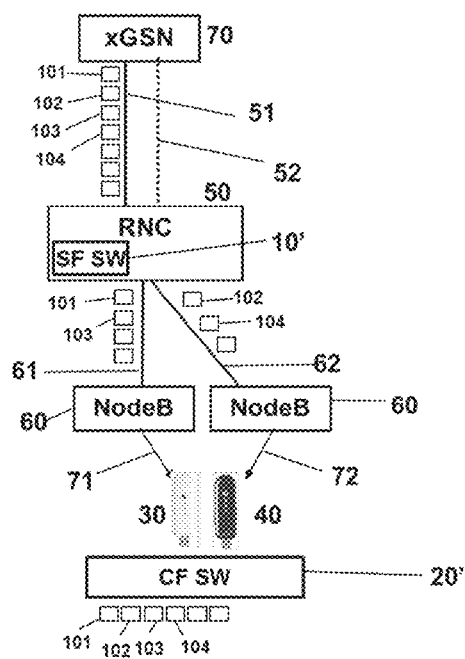
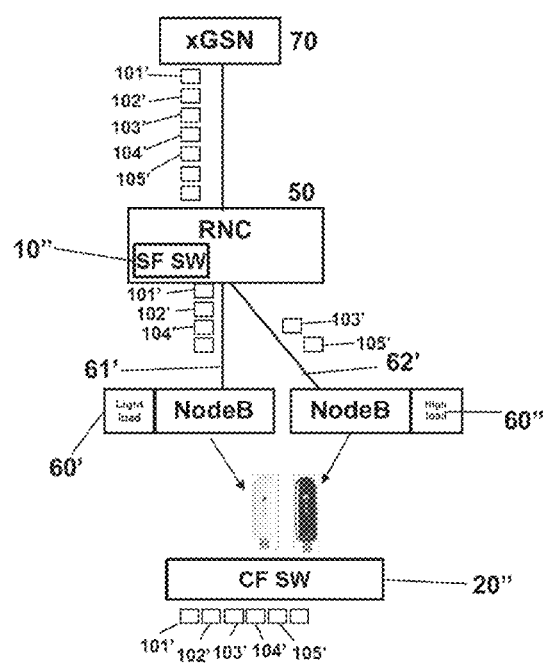
FIG. 2A
FIG. 2B

SYSTEM AND METHOD FOR TRANSMITTING DATA PACKETS TO A PLURALITY OF MOBILE TERMINATIONS THROUGH A SINGLE IP CONNECTION

CROSS REFERENCE TO RELATED APPLICATIONS

This application claims priority to Spanish Application Number P201230542, filed on Apr. 11, 2012, the entirety of which is incorporated herein by reference.

FIELD OF THE INVENTION

The present invention has its application within the field of telecommunications and, more specifically, in the area engaged in providing a user with data packets from carriers located in different frequency bands.

BACKGROUND OF THE INVENTION

The Third Generation Partnership Project (3GPP) has developed a series of standardized specifications describing mechanisms for allowing aggregation of data from carriers located in the same or different frequency bands. The solution developed by 3GPP has two important limitations: the cells on the different frequencies to be aggregated must be collocated; and new terminals have to be developed so that they support each new aggregation capability developed.

The deployment of different frequency layers in the network is such that that collocation cannot always be guaranteed. For example, when aggregating cells from the 900 MHz and 2100 MHz bands (both bands being used by the Third Generation—3G—radio technology, UMTS), there are many scenarios where a user in coverage of the 900 MHz band can also be in coverage of a 2100 MHz cell which is not collocated (especially when 900 MHz is deployed as a coverage complement to 2100 MHz). Moreover, there will be so many different aggregation scenarios across bands and technologies that it will be difficult to secure support for all scenarios in terminals.

Likewise Multicarrier HSPA and LTE Carrier Aggregation (LTE-Advanced) are standardized, but time to market of new terminals capable of supporting such standards is long and frequency support can lead to a fragmented terminal "ecosystem".

Thus, there is a need for a facility for aggregating different carriers within the same technology, or carriers from a number of different technologies, using existing terminals without mandating dedicated terminals requiring specific development from chipset vendors.

SUMMARY OF THE INVENTION

The invention refers to a radio network entity and a method for transmitting data packets in a telecommunications network according to claims 1, and 8, respectively, and to a user terminal for receiving data packets according to claim 7. Preferred embodiments of the radio network entity and the method are defined in the dependent claims.

A first aspect of the invention relates to a radio network entity for transmitting data packets from an IP gateway in a telecommunications network to a user terminal via a plurality of mobile terminations through a single IP connection. A useful definition of mobile termination is given in the 3GPP technical specification TS 23.101. Strictly speaking, a mobile termination is that part of a user equipment (UE) which performs the radio transmission and related functions: it does not necessarily include a component where the end-to-end application is experienced (that would be termed the "terminal equipment" (TE) and may actually refer to a physically separate, but logically attached, device such as a laptop "tethered" to a mobile phone).

According to the invention the radio network entity comprises:

a module for establishing IP connections between the IP gateway and mobile terminations in response to a request for establishing IP connections from the user terminal, said module also establishing radio connections between the radio network entity and the mobile terminations each of them paired with the corresponding IP connection;

wherein the module activates a first IP connection and a first radio connection in response to a request for establishing an IP connection from a first mobile termination of the plurality of mobile terminations;

wherein the module activates at least a second IP connection and a second radio connection in response to a further request for establishing an IP connection from at least a second mobile termination of the plurality of mobile terminations;

a packet splitter that applies a splitting algorithm to determine which radio connection is to be used to transmit which data packets, the packet splitter being in communication with a packet combiner in the user terminal, each of the mobile terminations being connectable with the packet combiner;

wherein the packet splitter splits the data packets coming only from the first IP connection selected by the user terminal as the only IP connection through which the data packets are received, thereby transmitting data packets over said at least first and second radio connections for combining at the packet combiner.

The radio network entity can be implemented in a RNC or in an eNodeB.

The data packets can be transmitted to each mobile termination of said plurality using each one different frequency carriers. Said frequency carriers belongs to a same radio access technology. Or each of said frequency carriers can belong to a different radio access technology.

A further aspect of the invention refers to a user terminal for receiving data packets from a radio network entity in a telecommunications network via a plurality of mobile terminations connected to the user terminal. The user terminal comprises:

a module for requesting establishment of at least a first IP connection and at least a second IP connection between an IP gateway in the telecommunications network and at least of first mobile termination and a second mobile termination of the plurality of mobile terminations, said module selecting only said at least first IP connection as the only IP connection through which data packets are received; and, a packet combiner that applies a combining algorithm to combine data packets received from each of the plurality of radio connections associated with each of the plurality of mobile terminations and terminates the single IP connection in the user terminal.

A further aspect of the invention refers to a method for transmitting data packets from an IP gateway in a telecommunications network to a user terminal via a plurality of mobile terminations through a single IP connection. The method comprises the steps of:

establishing IP connections between the IP gateway and the mobile terminations in response to a request for establishing IP connections from the user terminal;

establishing radio connections between a radio network entity and the mobile terminations each of them paired with the corresponding IP connection;

activating a first IP connection and a first radio connection in response to a request for establishing an IP connection from a first mobile termination of the plurality of mobile terminations;

activating at least a second IP connection and a second radio connection in response to a further request for establishing an IP connection from at least a second mobile termination of the plurality of mobile terminations;

applying a splitting algorithm to determine which radio connection is to be used to transmit which data packets, the splitting algorithm splitting the data packets coming only from the first IP connection selected by the user terminal as the only IP connection through which the data packets are received;

transmitting data packets over said at least first and second radio connections to the at least first and second mobile terminations, respectively; and applying a combining algorithm which corresponds to the splitting algorithm for combining the data packets received at the user terminal via said at least first and second mobile terminations.

Each mobile termination preferably uses a different SIM/IMSI, and the mobile network is informed that they are inter-related. Or according to another possible implementation, each mobile termination of the plurality of mobile terminations uses the same SIM/IMSI.

Said plurality of mobile terminations can be implemented in a single physical chipset. Or said plurality of mobile terminations can be implemented in a plurality of USB dongles, or in a plurality of mobile terminals.

The present invention allows managing a multiplicity of carrier units from one or different bands as well as from one or different technologies, co-ordinating the usage of these carriers in such a way to be able to split packet data flows over these carriers and recombine the relevant packet date flow at terminal level. This is achieved reusing a multiplicity of User Equipment (UE) supporting operation in these carriers, each UE operating a given subset of carriers. The terminal is therefore made of a number of UE thereby achieving a capacity boost without requiring the development of expensive new terminal equipment.

The advantages of the proposed invention will become apparent in the description that follows.

BRIEF DESCRIPTION OF THE DRAWINGS

To complete the description and in order to provide for a better understanding of the invention, a set of drawings is provided. Said drawings form an integral part of the description and illustrate preferred embodiments of the invention, which should not be interpreted as restricting the scope of the invention, but rather as examples of how the invention can be embodied. The drawings comprise the following figures:

FIGS. 2A and 2B show two possible ways of splitting the data packets.

DETAILED DESCRIPTION OF THE PREFERRED EMBODIMENTS

Reference will now be made in detail to a preferred embodiment of the present invention.

Figure 1:
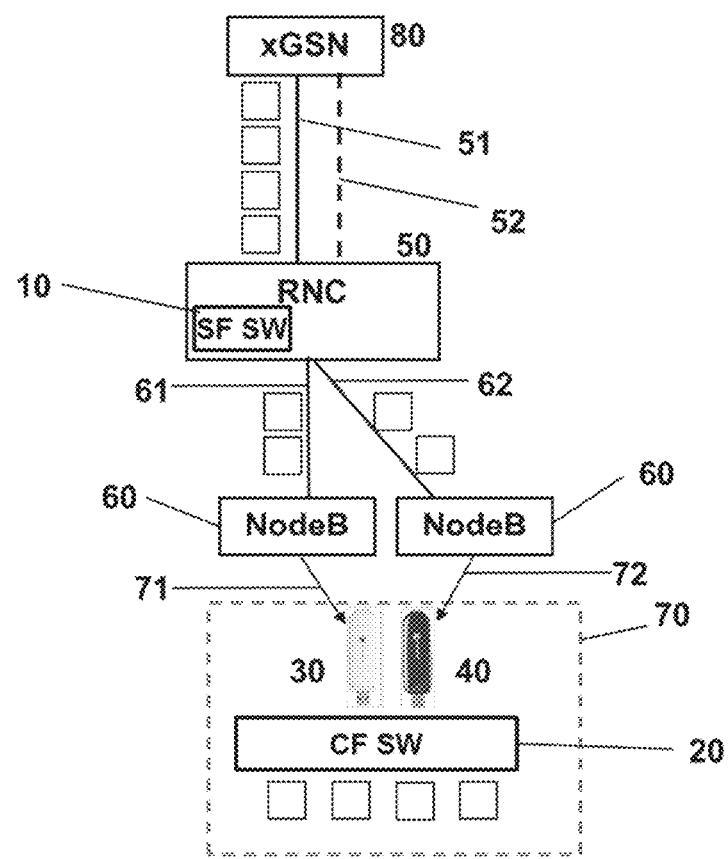
FIG. 1 shows the architecture of a preferred embodiment of the system of the invention for the case of aggregation of same technologies (e.g. aggregation of multiple 3G/UMTS carriers across a multiplicity of bands).

FIG. 1 illustrates an embodiment of the invention, where two USB dongles 30, 40 are in respective radio connections 71, 72 over different frequency bands of the same radio access technology, say UMTS at 2100 MHz (UMTS2100) and UMTS at 900 MHz (UMTS900), respectively.

The following non-exhaustive list illustrates other possible combinations, not precluding any other combination of frequency bands on the same technology or a mix of technologies:

UMTS2100+UMTS2100 (same band, different carriers)
UMTS2100+UMTS900
LTE800+LTE1800
LTE800+LTE2600
LTE2600+LTE1800
UMTS900+LTE800
UMTS2100+LTE800
UMTS2100+LTE2600

In any of the above cases, each USB dongle 30, 40 is forced to operate in one allowed frequency carrier on the relevant band. This can be done in several ways, either by means of the network (through Handover commands) or by the USB dongle itself. For example it can be done by locking each USB dongle onto a specific band (e.g. using the dashboard).

The two USB dongles 30, 40 are associated and connected to a same user terminal 70 or customer. However the identifiers used for the USB dongles 30,40 at UTRAN (RNC 50) or E-UTRAN level are different, since the identifier such as TMSI or U-RNTI (Radio Network Temporary Identifier) are typically unique and they cannot be reused for two different radio connections. However these UTRAN or E-UTRAN level identifiers can be somehow bound and pointed to the same customer, by means of messages exchanged between the radio network controller RNC 50 and the user terminal 70 (which will be explained below in connection with FIG. 3). The RNC 50 receives the following information from the user terminal 70: the identifiers of both connections (IMSI/C-RNTI/IMEI/GUTI/TMSI/EPS Bearer ID) and the capabilities of both USB dongles. And then the RNC 50 is able to associate both radio connections 71, 72 to the same user terminal 70.

3G+3G Case

According to 3GPP standard 25.304, the USB dongle searches for a suitable cell of the selected PLMN and selects that cell to provide available services, and uses its control channel for all control signalling necessary in management of services. This selection is known as "camping on the cell". The USB dongle will, if necessary, then register its presence by means of a NAS registration procedure, in the registration area of the chosen cell and as outcome of a successful Location Registration the selected PLMN becomes the registered PLMN.

Once camping of the two USB dongles is achieved, each USB dongle establishes its own IP connection 51, 52 with an IP gateway 80 (xGSN). As indicated above, the RNC 50 (Radio Network Controller) receives the same customer identifier (i.e. IMSI/TMSI, etc.) through the two USB dongles operating in different cell-carriers, thereby establishing an association between both connections. A possible implementation is to have different SIMs with different IMSIs in each dongle.

The data packets are transmitted using only one of the IP connections, the IP connection 51 which is active (shown by a solid black line), while the other IP connection 52 remains idle (shown by a broken line). Each IP connection includes the assignment of an IP address to the USB dongle for use in directing data packets to the USB dongle.

The information of each IMSI is sent to the RNC through the direct communication messages between them and the radio network, and then the two USB dongles can actually be bound to using the active IP connection (and the associated USB dongle IP address).

A packet splitter 10 in the RNC 50 then splits the data and distributes them to both USB dongles based on a pre-established packet splitting algorithm.

If both cells are in different Nodes B 60 (as shown in FIG. 1), the split can be done at the RNC 50 following any flow control typically used in the Iub today.

If both cells belong to the same Node B (not shown), the split can be done at the RNC as in the previous case or directly at the Node B, which would provide more efficient aggregation.

The data packets are then combined at a packet combiner 20 at the user terminal 70.

FIG. 2A shows a first possibility of a straightforward packet splitting algorithm for a set of data packets 101-104. In this case, a packet splitter 10' uses a packet splitting algorithm which equally splits the data packets received only via the first IP connection 51 between the two Iub connections 61, 62: packet i 101 goes to the first Iub connection 61, packet i+1 102 goes to the second Iub connection 62, packet i+2 103 to the first Iub connection 61 again, packet i+3 104 goes to the second Iub connection 62, and so forth.

Once the set of data packets 101-104 reach the user terminal 70 end through the respective radio connections 71, 72, a packet combiner 20' combines said set of data packets received using a combining algorithm which corresponds to the splitting algorithm used in the packet splitter 10'.

FIG. 2B shows another example of a packet splitting algorithm with packet splitter 10" which splits the data packets received only via the first IP connection 51 depending on the load of the Node B's. In this case, a first Node B 60' has a lighter load than the one supported by a second Node B 60" and so packet i 101' goes to the first Iub connection 61' and so does packet i+1 102', while packet i+2 103' goes to the second Iub connection 62'; then packet i+3 104' goes again to the first NodeB 60', but packet i+4 105' goes to the second Node B 60".

Different types of load information can be used for the packet splitting algorithm to schedule more or less packet towards one of the USB dongles: using flow control information or load metrics such as latency, power or code measurements in 3G reported to the RNC.

Once the set of data packets 101'-105' reach the user terminal, a packet combiner 20" combines said set of data packets received using a packet combining algorithm which corresponds to the packet splitting algorithm used in the packet splitter 10".

Alternatively, the IMSIs could be the same for the SIMs used in all the USB dongles (or mobile terminations) for which aggregation is required. In this case, there only is one IP connection opened, and then the RNC then binds the two USB dongles (or mobile terminations) through other information in the signalling exchanged with the dongles/mobile terminations.

Figure 3:
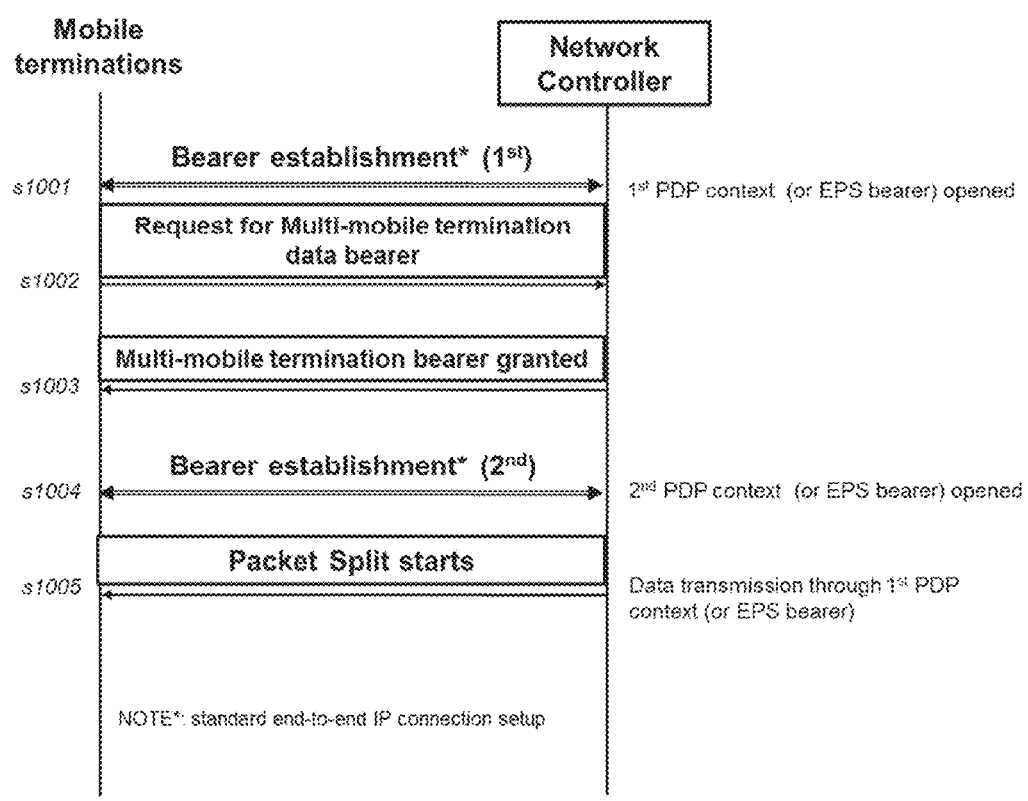
FIG. 3 shows the exchange of messages during a generic connection set-up.

FIG. 3 shows the exchange of messages for a connection setup, whether both bearer connections are to be 3G connections or one or more connection is to be over LTE. First of all there is a first bearer (virtual connection) establishment by the first mobile termination (step s1001). It can be done in 3G (using a PDP context) or in LTE (with an EPS bearer). Then a channel is allocated, and the first mobile termination is in connected state. Then through this connection, a message is sent from the network controller to the mobile termination to request the setup of a multiple mobile terminations aggregated connection (step s1002). This is sent at application level in the user plane of the 3G or LTE connection. This request is a non-standard message used and defined for this specific purpose. In this message, all the necessary information to set-up both connections is contained knowing the different mobile terminations used by the same subscriber, for example the information about the IMSI used in the second mobile termination, the identifiers of both connections—IMSI/C-RNTI/IMEI/GUTI/TMSI/EPS Bearer ID—, the capabilities of both mobile terminations and the software version supported. Then the network controller receives this setup request message and answers with a message to give specific information related to the new connection and ultimately whether or not the requested aggregated connection is granted.

If the answer is positive (step s1003), a second connection is established using the conventional channel setup mechanism (step s1004). This second connection could be in 3G or LTE according to the different cases described in this document. Once the second leg connection is setup, the controller realizes that this new connection is coming from the same subscriber and then only first IP address available from the first virtual connection (first PDP context or EPS bearer) is used splitting the packets between both connections (step s1005). The aggregated connection is then ready for use.

LTE+LTE Case

In the case of LTE, the equivalent to the RNC functions are located in the eNodeB; the eNodeB establishes the EPS bearer of the first USB dongle, then when the second USB dongle performs an EPS bearer setup for that dongle, it is then able to associate both connections.

Both USB dongles can be in the same cell or even different cells of the same eNodeB (different sectors or different frequency bands, for example, 1800 and 2600).

In the case of different SIMs/IMSIs, once camping of the two USB dongles or mobile terminals is achieved, each USB dongle establishes its respective EPS bearer, but only one of these EPS bearers carries user data and is associated to an active APN (Access Point Number). The data packets are then split at a packet splitter distributed to both USB dongles based on a packet splitting algorithm. This is done at the eNodeB level. EPS bearers, it should be noted, include an IP address (sometimes referred to as the "PDN IP address") that is allocated to the USB dongle.

As in the 3G case, the data packets are received at the user terminal through each USB dongle via the corresponding radio connection, and combined in the corresponding packet combiner.

In the same way as in the 3G+3G case, it is possible to use a unique SIM/IMSI. In this case again, there is only one EPS bearer and the USB dongle communicates with the eNodeB to setup a double radio connection associated with this common EPS bearer.

UMTS+LTE Case

In the case of UMTS and LTE aggregation, the mobile terminations can either establish the first bearer on UMTS or LTE according to the preferred strategy of the operator. This can be defined, for example, in the dashboard. Starting the first connection on LTE is faster; however, this approach requires more signalling to the RNC who is the controller aware of the possibility of binding the USB dongle connections.

Both USB dongles (or mobile terminations) are connected to different cells: UMTS and LTE cells (different sectors and/or different frequency bands, for example, 2100 MHz and 2600 MHz).

In the case of different SIMs/IMSIs, once the connections (PDP context and the EPS bearer) are established, only one of the two is selected by the RNC to carry user data and is associated to an active APN (Access Point Number). The data packets are then split at a packet splitter distributed to both USB dongles based on a packet splitting algorithm. This is done at the RNC level.

The data packets are received at the user terminal through each USB dongle and combined in the corresponding packet combiner.

In the same way as in the 3G+3G case, both SIMs/IMSIs can be the same, but the RNC and the eNodeB are able to understand that they can be bound.

The invention is obviously not limited to the specific embodiments described herein, but also encompasses any variations that may be considered by any person skilled in the art (for example, as regards the choice of components, configuration, etc.), within the general scope of the invention as defined in the appended claims.

The invention claimed is:

1. A radio network entity for transmitting data packets from an IP gateway in a telecommunications network to a user terminal via a plurality of mobile terminations through a single IP connection, the radio network entity comprising:
   a module for establishing simultaneous IP connections between the IP gateway and the plurality of mobile terminations in response to a request for establishing IP connections from the user terminal, said module also establishing radio connections between the radio network entity and the plurality of mobile terminations, each of them paired with the corresponding IP connections;
      wherein the module activates a first IP connection and a first radio connection in response to a request for establishing an IP connection from a first mobile termination of the plurality of mobile terminations;
      wherein the module activates at least a second simultaneous IP connection and a second radio connection in response to a further request for establishing an IP connection from at least a second mobile termination of the plurality of mobile terminations; and
   a packet splitter that applies a splitting algorithm to determine which radio connection is to be used to transmit which data packets, the packet splitter being in communication with a packet combiner in the user terminal, each of the plurality of mobile terminations being connectable with the packet combiner;
      wherein the packet splitter splits the data packets coming only from the first IP connection selected by the user terminal as the only IP connection through which the data packets are received, such that the first and second mobile terminations are bound to the same IP connection, thereby transmitting data packets over said at least first and second radio connections for combining at the packet combiner.

2. A radio network entity according to claim 1, wherein data packets are transmitted to each mobile termination of said plurality using each one different frequency carriers.

3. A radio network entity according to claim 2, wherein each of said frequency carriers belongs to a same radio access technology.

4. A radio network entity according to claim 2, wherein each of said frequency carriers belongs to a different radio access technology.

5. A radio network entity according to claim 1, which is implemented in a radio network controller (RNC).

6. A radio network entity according to claim 1, which is implemented in an eNodeB.

7. A user terminal for receiving data packets from a radio network entity in a telecommunications network via a plurality of mobile terminations connected to the user terminal;
   the user terminal comprising:
      a module for requesting establishment of at least a first IP connection and at least a second simultaneous IP connection between an IP gateway in the telecommunications network and at least of first mobile termination and a second mobile termination of the plurality of mobile terminations, said module selecting only said at least first IP connection as the only IP connection through which data packets are received, such that the first and second mobile terminations are bound to the same IP connection; and,
      a packet combiner that applies a combining algorithm to combine data packets received from each of the plurality of radio connections associated with each of the plurality of mobile terminations and terminates the single IP connection in the user terminal.

8. A method for transmitting data packets from an IP gateway in a telecommunications network to a user terminal via a plurality of mobile terminations through a single IP connection,
   the method comprising the steps of:
      establishing simultaneous IP connections between the IP gateway and the mobile terminations in response to a request for establishing IP connections from the user terminal;
      establishing radio connections between a radio network entity and the mobile terminations each of them paired with the corresponding IP connection;
      activating a first IP connection and a first radio connection in response to a request for establishing an IP connection from a first mobile termination of the plurality of mobile terminations;
      activating at least a second IP connection and a second radio connection in response to a further request for establishing an IP connection from at least a second mobile termination of the plurality of mobile terminations;
      applying a splitting algorithm to determine which radio connection is to be used to transmit which data packets, the splitting algorithm splitting the data packets coming only from the first IP connection selected by the user terminal as the only IP connection through which the data packets are received, such that the first and second mobile terminations are bound to the same IP connection;
      transmitting data packets over said at least first and second radio connections to the at least first and second mobile terminations, respectively; and
      applying a combining algorithm which corresponds to the splitting algorithm for combining the data packets received at the user terminal via said at least first and second mobile terminations.

9. A method according to claim 8, wherein each mobile termination uses a different subscriber identity module (SIM)

or international mobile subscriber identity (IMSI), and the telecommunications network is informed that they are interrelated.

10. A method according to claim 8, wherein every mobile termination uses the same SIM/IMSI.

11. A method according to claim 8, wherein said plurality of mobile terminations is implemented in a single physical chipset.

12. A method according to claim 8, wherein at least one of said plurality of mobile terminations is implemented in a USB dongle.

13. A method according to claim 8, wherein said plurality of mobile terminations is implemented in a plurality of mobile terminals.

* * * * *